J. W. NORTON & P. N. SUMRALL.
SPOKE TIGHTENER.
APPLICATION FILED FEB. 11, 1911.
1,028,379.
Patented June 4, 1912.
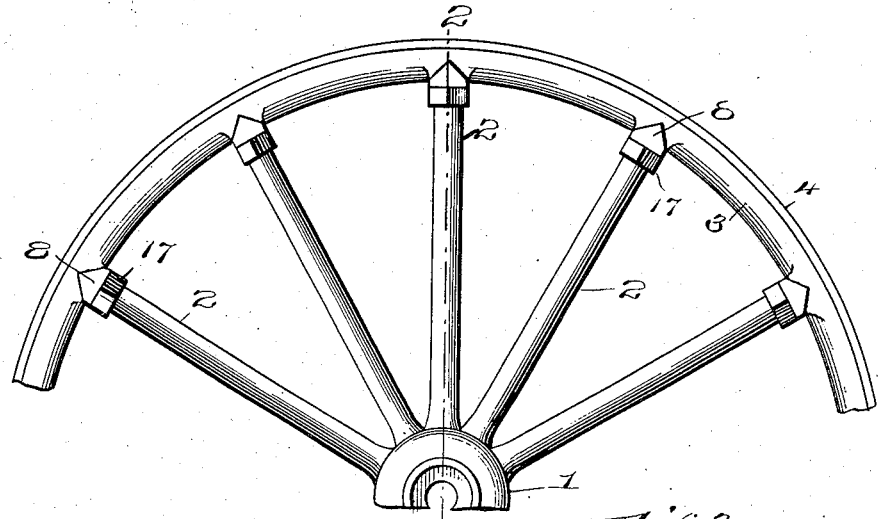
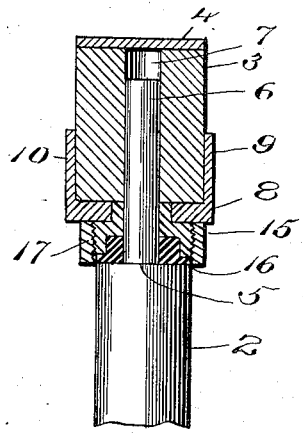
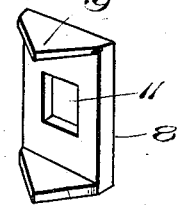
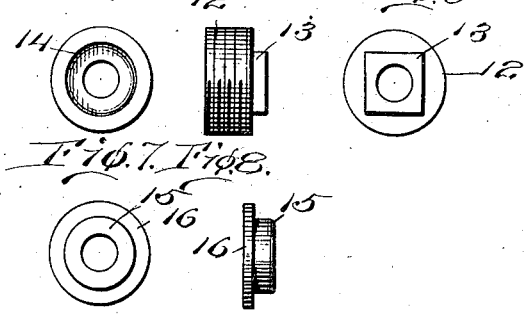
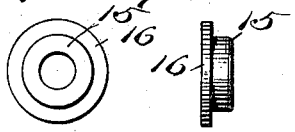

UNITED STATES PATENT OFFICE.

JOHN W. NORTON, OF LOCKNEY, AND PERRY N. SUMRALL, OF QUITAQUE, TEXAS.

SPOKE-TIGHTENER.

1,028,379.  Specification of Letters Patent.  Patented June 4, 1912.

Application filed February 11, 1911. Serial No. 608,032.

*To all whom it may concern:*

Be it known that we, JOHN W. NORTON and PERRY N. SUMRALL, citizens of the United States, and residents of Lockney, in the county of Floyd and State of Texas, and Quitaque, in the county of Briscoe and State of Texas, respectively, have invented certain new and useful Improvements in Spoke-Tighteners, of which the following is a specification.

This invention relates to improvements in spoke tighteners, and has for an object the arrangement of improved means for quickly taking up any loose motion between the spokes of a wheel and the felly without injury to either of said members.

Another object of the invention is the arrangement of an exteriorly threaded sleeve designed to fit over the end of a spoke, and bear against a shouldered portion on the spoke, the sleeve being adapted to accommodate a nut threaded thereover and co-acting with a plate engaging the felly of a wheel for bracing the felly and preventing any splitting thereof, and at the same time holding the sleeve in proper position to be moved longitudinally by said nut for taking up any loose motion between the felly and the spoke.

With these and other objects in view the invention comprises certain novel constructions, combinations, and arrangement of parts as will be hereinafter more fully described and claimed.

In the accompanying drawings: Figure 1 is a fragmentary view of a wheel provided with one embodiment of the invention. Fig. 2 is an enlarged sectional view on line 2—2 of Fig. 1. Fig. 3 is a detail perspective view of a bracing plate or clip. Fig. 4 is an end view of a sleeve embodying certain features of the invention. Fig. 5 is a side view of the sleeve shown in Fig. 4. Fig. 6 is a view of the opposite end of the sleeve to that shown in Fig. 4. Fig. 7 is an end view of the packing member. Fig. 8 is an edge view of the packing member shown in Fig. 7.

In constructing a device embodying the invention it is desired to form means simple in structure but effective for thoroughly tightening and holding in such position the spokes and rim or felly of a wheel. The spokes and the felly are made in the usual manner, and a plate or clip formed with an aperture, preferably square, is fitted on the felly, so that the aperture in the plate will register with the aperture in the felly in order to accommodate the reduced extension of the spoke. This structure, of course, is provided for each spoke of the wheel, so that any part of the wheel coming loose may be quickly tightened. A sleeve formed with a squared portion fitting into the squared aperture in the plate is provided, and is designed to bear either directly against the shouldered portion of the spokes or to bear against a packing or cushioning member, which in turn bears against the shoulder of the spokes. This sleeve is designed to be moved longitudinally by a suitable nut engaging the same, and pressing against the plate.

In order that the invention may be more clearly understood an embodiment of the same is shown in the accompanying drawings, in which—

1 indicates the hub of a wheel having any desired number of spokes 2, a felly 3, and a tire 4. The spokes 2 and felly 3 may be of any desired structure, as for instance, wood, while the tire 4 is of metal. The spokes are each provided with a shouldered portion 5, and a reduced extension 6 which fits into aperture 7 of felly 3. Fitted on the felly 3 at each of the spokes 2 is a plate or clip 8 having upturned ears 9 and 10 which engage the opposite side of a felly to prevent rotation of the plate 8 and said plate 8 being formed with a squared aperture 11. This clip assists in preventing any breaking or splitting of the felly near aperture 7 whenever any breaking or splitting strain is brought to bear thereon. Associated with plate 8 is a sleeve 12 formed with a squared portion 13 fitting into the squared aperture 11, and a socket portion 14 which accommodates the boss 15 of the cushion or packing member 16. Sleeve 12 is threaded exteriorly with any size threads desired for accommodating an interiorly threaded nut 17. Nut 17 is preferably made hexagonal, and is designed to engage the threads of the sleeve 12, and at one end bear against plate 8 so that when turned in one direction the nut will bear against plate 8 and the sleeve 12 will move longitudinally with the spoke 2 in a direction away from felly 3, so as to take up any loose motion between the spoke and felly.

Preferably a cushion or packing member 16 is provided to prevent water and other foreign matter from entering. This packing member 16 may be made from rubber, fiber, or other desired material, or if preferred may be entirely omitted and the shoulder 5 of spoke 2 be caused to rest against the end of sleeve 12. It will also be evident that the aperture 11 and the squared portion 13 may be made some other shape, as for instance hexagonal, without departing from the invention, as this arrangement permits a free longitudinal movement of the sleeve 12, but prevents any turning of the sleeve 12 when nut 17 is being rotated, so that the only movement of sleeve 12 is longitudinal. Preferably nut 17 and sleeve 12 are made of sufficient size to permit the end of spoke 2 to press against sleeve 12 if the packing member 16 should be removed.

What we claim is:

In a spoke tightener, a plate having integral ears upstanding from its edges adapted to straddle the rim of a wheel, said plate having a non-circular opening therethrough in alinement with the bore in the rim, a sleeve having a lug extending from one end thereof of the same configuration as the opening through said plate, said sleeve being externally threaded and having the opposite end to the lug cupped, said sleeve having an opening therethrough of the proper size to receive a tenon, a fiber or other washer having one face thereof adapted to fit compactly within the cupped face of the sleeve and a flange to bear against the walls of said cup, and the other face perpendicular to the bore of said washer to receive the shoulder formed by the tenon of a spoke and an outer sleeve adapted to fit over said first mentioned sleeve, said outer sleeve having a non-circular perimeter and one end thereof adapted to bear against said plate.

In testimony whereof we affix our signatures in presence of two witnesses.

JOHN W. NORTON.
PERRY N. SUMRALL.

Witnesses:
 ROBT. T. LANG,
 MARIE S. MEEM.

Copies of this patent may be obtained for five cents each, by addressing the "Commissioner of Patents, Washington, D. C."